United States Patent

Gay

[15] 3,648,196

[45] Mar. 7, 1972

[54] SIGNALS MODULATOR IN AUDIOMETRY APPARATUS

[72] Inventor: Guido Gay, Milan, Italy

[73] Assignee: Amplifon S.a.s., Milan, Italy

[22] Filed: Feb. 26, 1970

[21] Appl. No.: 14,613

[30] Foreign Application Priority Data

Feb. 27, 1969 Italy ................................13433 A/69

[52] U.S. Cl. ..........................332/16 T, 179/1 N, 181/0.5 G, 307/238, 307/251, 307/304, 332/29

[51] Int. Cl. ..........................................................H03c 3/22

[58] Field of Search ...............332/16, 16 T, 29, 27; 307/251, 307/238, 240, 304; 330/35; 179/1 N; 181/0.5 G

[56] References Cited

UNITED STATES PATENTS

| | | | |
|---|---|---|---|
| 3,373,295 | 3/1968 | Lambert | 307/238 |
| 3,518,454 | 6/1970 | French | 307/251 |

FOREIGN PATENTS OR APPLICATIONS

| | | | |
|---|---|---|---|
| 1,016,975 | 1/1966 | United Kingdom | 307/251 |
| 17,043 | 7/1969 | Japan | 330/35 |

*Primary Examiner*—Alfred L. Brody
*Attorney*—Stevens, Davis, Miller & Mosher

[57] ABSTRACT

A device for the switching and/or modulation of a signal, particularly in audiometry apparatus, comprising a voltage divider consisting of a field-effect transistor and at least one fixed resistor, the signal to be modulated being applied across the divider and withdrawn between said transistor and said fixed resistor.

6 Claims, 2 Drawing Figures

Patented March 7, 1972 3,648,196

G. GAY
Inventor

By Stevens, Davis, Miller & Mosher
Attorneys

SIGNALS MODULATOR IN AUDIOMETRY APPARATUS

BACKGROUND OF THE INVENTION

1. Field of the Invention

One of the well-known problems of audiometry is the provision of modulators and switches which have perfectly controllable rise and fall times, and which even during rise and fall do not give rise to distortions and discontinuities in the signal emitted.

2. Description of the Prior Art

Heretofore the best results have been obtained with voltage dividers incorporating photoresistors and controlled by the lighting and extinguishing of lamps. However these devices are very bulky, have a high-power consumption, and above all give rise and fall times which are difficult to determine.

Other systems have been proposed, such as vacuum tube modulators, switches with oscillator extinction and the like, which however give rise to a greater distortion which is absolutely unacceptable.

SUMMARY OF THE INVENTION

All these disadvantages are obviated by the device for modulation and switching according to the present invention, which provides a signal of perfectly controllable amplitude until switching is complete and which is absolutely free of distortions. This is attained by an electronic circuit in which the modulated signal is withdrawn from a voltage divider consisting of a field-effect transistor and at least one fixed resistor.

The invention exploits the property of field-effect transistors by which for small signals, e.g., not greater than 0.1 to 0.2 volts, they behave as ideal variable resistors. By connecting at least one fixed resistor in series, an attenuator system is obtained with variable attenuation and which is absolutely free of distortion.

BRIEF DESCRIPTION OF THE DRAWINGS

Further characteristics and advantages of the invention will be more evident by reference to some embodiments of an electronic circuit according to the invention shown diagrammatically in the accompanying drawings, in which.

DESCRIPTION OF THE PREFERRED EMBODIMENTS

Figure 1:
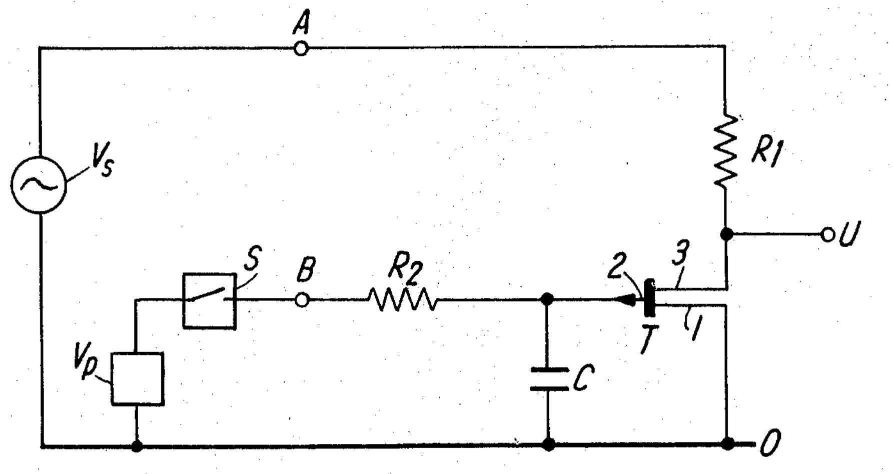
FIG. 1 is a diagram of a circuit preferably for use as a switch.

The circuit shown in FIG. 1 comprises a reference potential 0, an inlet A for the signal to be modulated, an input terminal B for the pilot signals (for example a fixed voltage $V_p$ controlled by a simple mechanical make and break switchs) and an output terminal U for the modulated signal.

The signal to be modulated is introduced at A, across the divider formed by the resistor $R_1$ and a field-effect transistor T having a first electrode 1 coupled to one terminal of the signal source $V_s$ and a third electrode 3 coupled to resistor $R_1$. The signal is then withdrawn at U between the resistor $R_1$ and the third electrode of transistor T. If the field-effect transistor T is a P-channel device, its resistance will be about 100 ohms when the signal at B is zero. This value will rise to many tens of megohms when the signal at B is positive (for example, 10 volts), considerably above the threshold of transistor T.

Supposing a resistor $R_1$ of one megohm is used, then the ratio between the resistor $R_1$, and the resistance of the transistor T, in the position of zero signal at B, is about 10,000, equal to an attenuation of 80 db. This value is considered more than sufficient for switching an audiometry signal.

In the case of a positive signal at B, the transistor T will have a resistance of about 10 megohms because of which the signal at U will be ten/eleven of that of A, equal to an attenuation of about one db. which is negligible for signal transmission.

The circuit comprising the resistor $R_2$ and capacitor C having their junction connected to the second electrode 2 of the transistor T permits control of the rise and fall time of the pilot voltage at B, and consequently the make and break time for the switches.

As stated, even during rise and fall times of the pilot voltage the transistor T behaves as an ideal resistance, (i.e., it operates in its ohmic region) variable in proportion to the pilot voltage itself, and providing the voltage of the signal to be modulated does not exceed 0.1 to 0.2 volts, the waveform of the signal at its output U undergoes no distortion.

Figure 2:
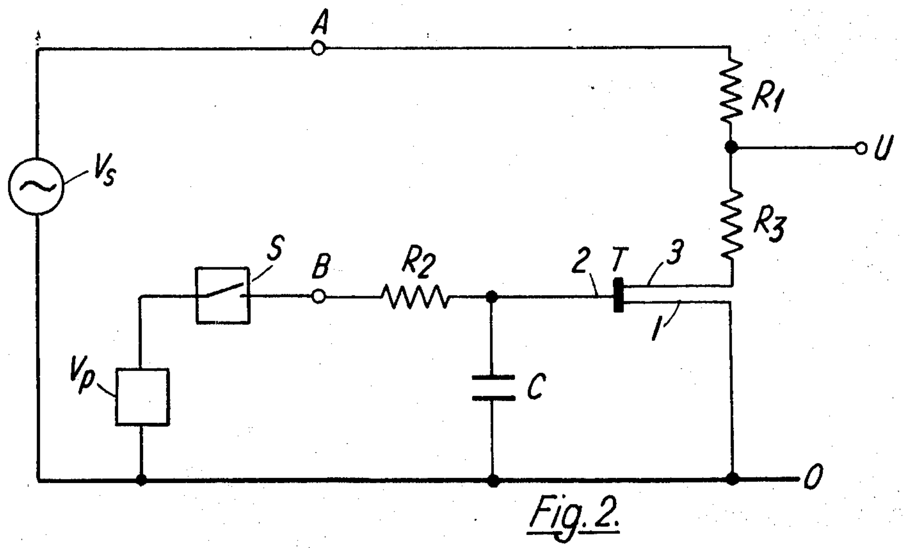
FIG. 2 is a diagram of a circuit preferably for use as a modulator.

In the embodiment shown in FIG. 2, a resistor $R_3$ is connected in series with the resistor $R_1$, between the output terminal U and the transistor T. If the resistor $R_3$ has a value similar to that of $R_1$, the signal to be modulated will be attenuated only by the ratio of $R_1$ to $R_3$ when the pilot signal is zero, as the resistance of the transistor T is negligible with respect to $R_1$ and $R_3$. In this manner an attenuation ratio is obtained which can be limited at will, with the possibility of modulating the signal amplitude to the depth required, with the same rise and fall time characteristics and without distortion. Modulation can easily be obtained by introducing at B a variable voltage, by means of a multivibrator for example.

The circuits illustrated are given by way of example only, but other embodiments are possible without leaving the field of the inventive concept.

I claim:

1. In audiometry apparatus, a device for the distortionless modulation of an alternating signal source comprising:
   a. a field-effect transistor having first, second and third electrodes, the first electrode of said field effect transistor being coupled to a terminal of said alternating signal source,
   b. first resistance means coupled between the third electrode of said field effect transistor and the other terminal of said alternating signal source,
   c. a capacitor coupled between the first and second electrodes of said field effect transistor,
   d. second resistance means having one end coupled directly to the junction between said capacitor and the second electrode of said field-effect transistor, and
   e. switching means for applying a pilot voltage source between the other end of said second resistor means and the first electrode of said field-effect transistor, said field-effect transistor operating in its ohmic region, the voltage applied between the first and second electrodes of said field effect transistor being a continuously increasing and decreasing modulating signal, a distortionless modulated output signal appearing between said first resistor means and the first electrode of said field-effect transistor.

2. A device of the type defined by claim 5 wherein said first resistance means comprises a resistor, the modulated output signal appearing between the first and third electrodes of said field-effect transistor.

3. A device of the type defined by clam 5 wherein said first resistance means comprises first and second series-connected resistors, the modulated output signal appearing between the junction of said first and second resistors and the first electrode of said field-effect transistor.

4. A device of the type defined by claim 5 wherein said switching means is a mechanical switch and said pilot voltage source is a fixed voltage.

5. A device of the type defined by claim 5 wherein said switching means is a multivibrator and said pilot voltage source is a variable voltage.

6. A device of the type defined by claim 6 wherein said first resistor has a value of approximately 1 megohm.

* * * * *

PO-1050
(5/69)

UNITED STATES PATENT OFFICE
CERTIFICATE OF CORRECTION

Patent No. 3,648,196 Dated March 7, 1972

Inventor(s) Guido Gay

It is certified that error appears in the above-identified patent and that said Letters Patent are hereby corrected as shown below:

The dependency of claims 2 - 6 are incorrect and should be changed to read as follows:

Claim 2, line 1, change "5" to -- 1 --.
Claim 3, line 1, change "5" to -- 1 --.
Claim 4, line 1, change "5" to -- 1 --.
Claim 5, line 1, change "5" to -- 1 --.
Claim 6, line 1, change "6" to -- 2 --.

Signed and sealed this 23rd day of January 1973.

(SEAL)
Attest:

EDWARD M.FLETCHER,JR.
Attesting Officer

ROBERT GOTTSCHALK
Commissioner of Patents